(12) United States Patent
Carroll

(10) Patent No.: US 6,543,471 B1
(45) Date of Patent: Apr. 8, 2003

(54) WATER HEATER FAIL SAFE APPARATUS

(76) Inventor: James H. Carroll, 1471 Dana La., Pueblo, CO (US) 81006

( * ) Notice: Subject to any disclaimer, the term of this patent is extended or adjusted under 35 U.S.C. 154(b) by 0 days.

(21) Appl. No.: 10/172,905

(22) Filed: Jun. 18, 2002

(51) Int. Cl.[7] .......................... F16K 31/32; F16K 31/44; F16K 33/00
(52) U.S. Cl. ................. 137/312; 122/504; 122/507; 137/421; 137/447; 137/449; 251/14; 251/73; 251/74; 251/294; 340/605; 340/623
(58) Field of Search ............... 122/504, 504.2, 122/507; 137/312, 420, 421, 447, 449; 251/14, 73, 74, 294; 340/605, 623

(56) References Cited

U.S. PATENT DOCUMENTS

| | | | | |
|---|---|---|---|---|
| 201,979 A | * | 4/1878 | Anderson | 137/421 |
| 1,028,681 A | * | 6/1912 | Creighton et al. | 251/74 |
| 3,473,553 A | * | 10/1969 | Collins | 137/312 |
| 3,920,031 A | * | 11/1975 | Maxfield | 137/312 |
| 4,305,420 A | * | 12/1981 | Nussdorf | 137/312 |
| 4,324,268 A | | 4/1982 | Jacobson | |
| 4,909,274 A | * | 3/1990 | Rodriguez | 137/312 |
| 4,944,253 A | * | 7/1990 | Bellofato | 122/504 |
| 5,038,820 A | | 8/1991 | Ames et al. | |
| 5,056,554 A | | 10/1991 | White | |
| 5,086,806 A | | 2/1992 | Engler et al. | |
| 5,193,780 A | * | 3/1993 | Franklin | 251/74 |
| 5,240,022 A | | 8/1993 | Franklin | |
| 5,345,224 A | * | 9/1994 | Brown | 340/623 |
| 5,632,302 A | * | 5/1997 | Lenoir, Jr. | 137/312 |
| 5,682,919 A | * | 11/1997 | DiMaggio | 137/312 |
| 5,713,387 A | * | 2/1998 | Armenia | 137/312 |
| 5,771,916 A | * | 6/1998 | Armenia et al. | 137/312 |
| 5,992,443 A | * | 11/1999 | Rodriquez | 137/312 |
| 6,024,116 A | * | 2/2000 | Almberg et al. | 137/312 |
| 6,253,785 B1 | * | 7/2001 | Shumake et al. | 137/312 |
| 6,336,469 B1 | * | 1/2002 | Nixon et al. | 137/312 |

* cited by examiner

*Primary Examiner*—George L. Walton
(74) *Attorney, Agent, or Firm*—Norman B. Rainer

(57) ABSTRACT

An apparatus for automatically shutting off a water supply to a leaking water heater includes a water-collecting tray adapted to be positioned beneath a water heater, and a float mechanism removably attachable to the tray. The float mechanism has a float adapted to reside within the tray. An arm extends from the float, and terminates in a trigger extremity located outside the tray. The trigger extremity is positioned to push upwardly upon a holding block that secures an extremity of a coil spring. The holding block also secures a tether that extends to an operating lever of a water shut-off valve. When the float rises in the tank, it causes the trigger extremity to release the coil spring in tensioned state from the holding block. Such action pulls the operating lever downwardly, causing shut-off of the water supply.

12 Claims, 3 Drawing Sheets

WATER HEATER FAIL SAFE APPARATUS

BACKGROUND OF THE INVENTION

1. Field of the Invention

This invention relates to apparatus for preventing flooding as a result of leakage from a water heater located in a building, and more particularly concerns apparatus for detecting such leakage and shutting off water flow to the leaking water heater.

2. Description of the Prior Art

Water heaters, whether in residential or commercial buildings, are susceptible to failure in a manner wherein the water within the heater and water entering the heater will leak uncontrollably onto the underlying floor. Such flooding could cause extensive damage to the building and its contents.

Systems have earlier been described for sensing a leak in a plumbing system, and automatically turning off the water feeding the plumbing system. One type of such detection and control system employs-flow monitoring sensors intended to discriminate between normal water flow and abnormal flows attributable to leaks. Such systems monitor either instantaneous flow or flows over a timed period, and send an electrical control signal to a shut-off valve. Such systems are disclosed, for example, in U.S. Pat. Nos. 4,589,435; 4,705,060; 5,000,224; 5,038,802; 5,056,554; 5,086,806 and elsewhere. Water shut-off systems of the aforesaid nature usually involve expensive computerized equipment and generally require specialized programming for proper installation.

In still other flood control systems, as disclosed in U.S. Pat. Nos. 4,324,268 and 5,240,022, sensors are disposed at floor level for detecting the presence of water, said sensors employing the water to complete an electrical circuit between two closely spaced electrodes. Such systems are unfortunately activated by the small amounts of water employed in the wet-mopping of floors, or small amounts of accidentally spilled water.

In yet another type of plumbing flood control system, a float-activated electrical switch positioned in a water-accumulating chamber is employed to control an electrically actuated valve. All the aforesaid plumbing flood control systems require a dependable source of electricity, and further permit the possibility of denial of water service to essential but sporadically operating systems such as fire extinguishing systems, lawn watering and cooling systems.

It is accordingly an object of the present invention to provide apparatus for automatically preventing flooding that might be produced by a faulty water heater.

It is a further object of this invention to provide apparatus as in the foregoing object which does not require a source of electricity.

It is another object of the present invention to provide apparatus of the aforesaid nature which is easily installable and is of durable construction amenable to low cost manufacture.

These objects and other objects and advantages of the invention will be apparent from the following description.

SUMMARY OF THE INVENTION

The above and other beneficial objects and advantages are accomplished in accordance with the present invention by an apparatus for automatedly shutting off a water supply to a leaking water heater, said apparatus comprising:

a) a water-collecting tray having a perimeter sidewall and adapted to be positioned beneath said water heater, b) an elongated rigid base strip attachable to said sidewall, c) a shut-off valve secured to said base strip and equipped with an operating lever, d) float means comprised of a buoyant head positioned within said tray, an elongated extension arm extending from said head to a distal extremity, a transverse arm extending orthogonally from said distal extremity and crossing over said sidewall, means for pivotally supporting said transverse arm, and a downwardly directed arm emergent from said transverse arm and terminating in a trigger extremity, e) an elongated coil spring having a normally contracted state and having a first end attached to said strip at a site adjacent said buoyant head, and a second end directed toward said trigger extremity, f) holding means for securing the second end of said spring when said spring is forcefully stretched toward said trigger extremity, said holding means being interactive with said trigger extremity in a manner to release said spring when said buoyant head is elevated by virtue of flotation upon water collected in said tray, g) first tether means extending in engagement between the second end of said spring and the lever of said shut-off valve, h) guide means secured to said strip for engaging said first tether in a manner causing said tether to have a sharply angled upward path directed toward said lever, and i) second tether means attached to the second end of said spring and extending to a distal end having means to facilitate manual gripping for exerting pulling force to extend said spring from its contracted to stretched state, whereby j) release of said stretched spring by said trigger extremity produces a pulling force upon said first tether means which moves said lever handle downwardly to a position representing closure of said shut-off valve.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
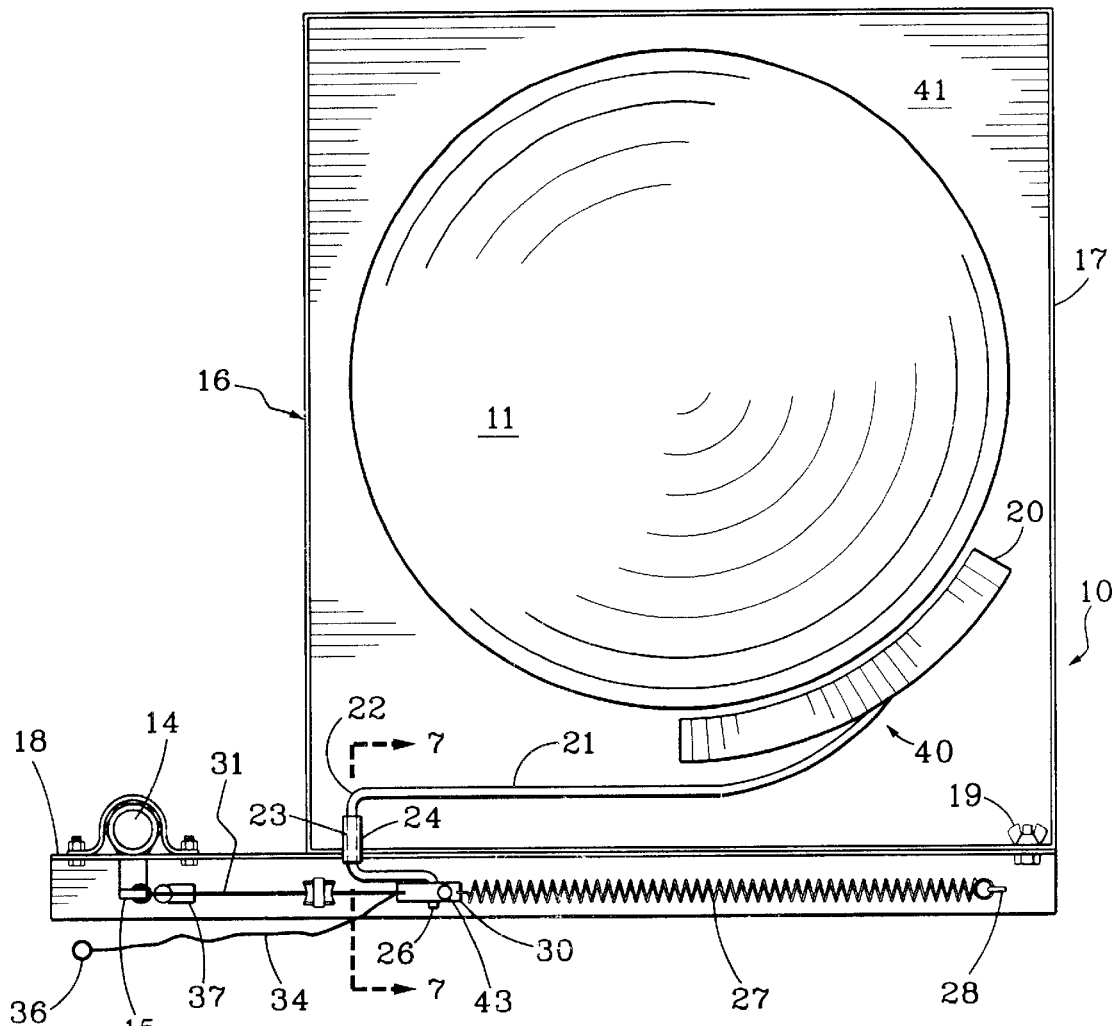
FIG. 1 is a schematic top view of an embodiment of the apparatus of the present invention shown in a standby or readiness state.
Figure 2:
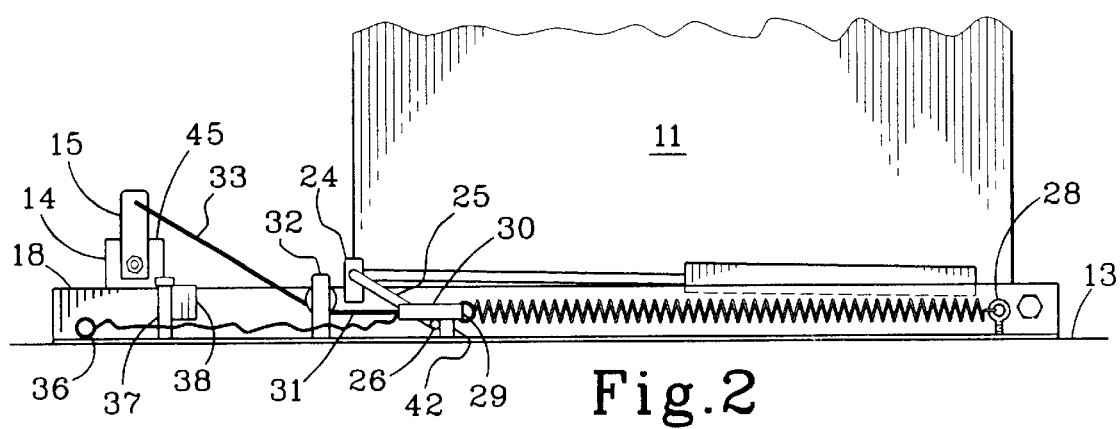
FIG. 2 is a side view of the embodiment of FIG. 1.
Figure 3:
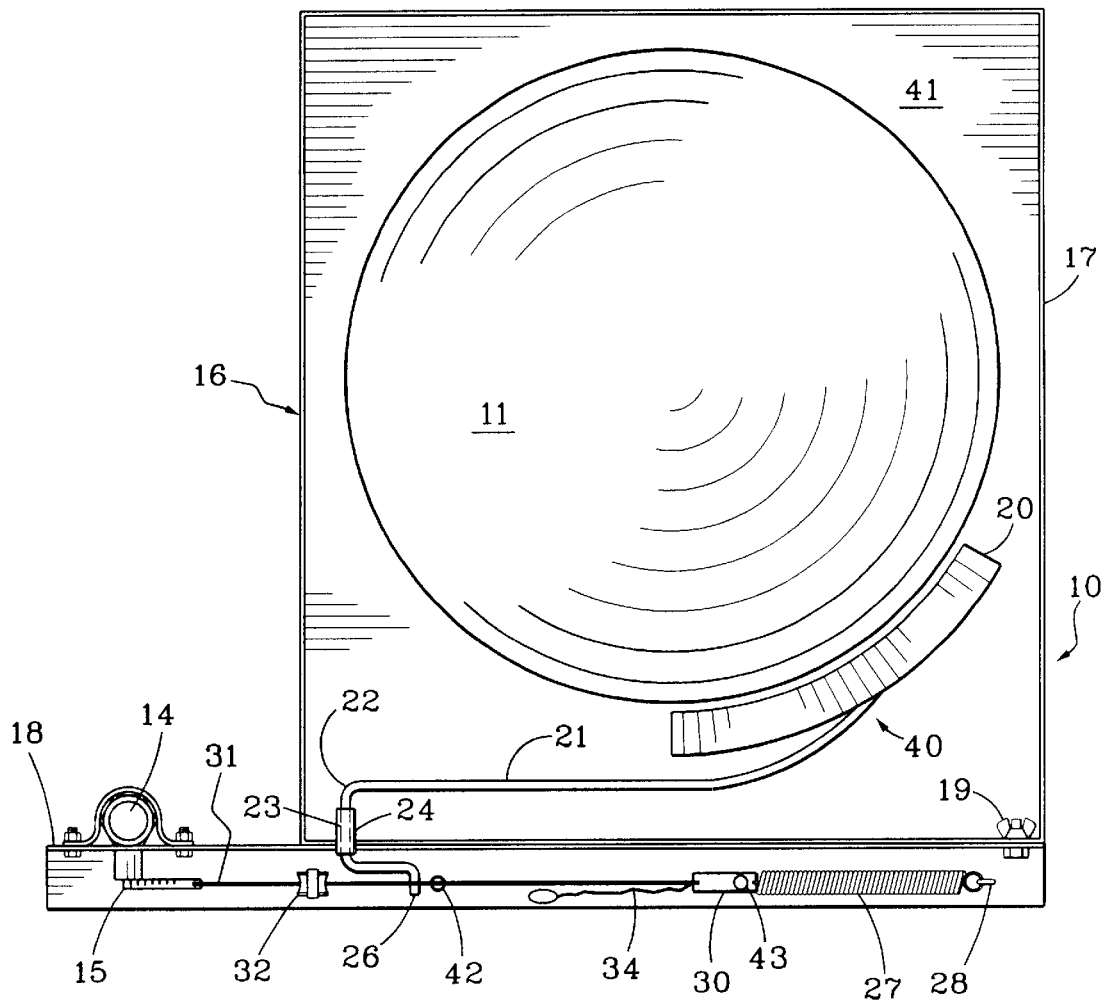
FIG. 3 is a schematic top view of the embodiment of FIG. 1, shown in an activated or shut-off state.
Figure 4:
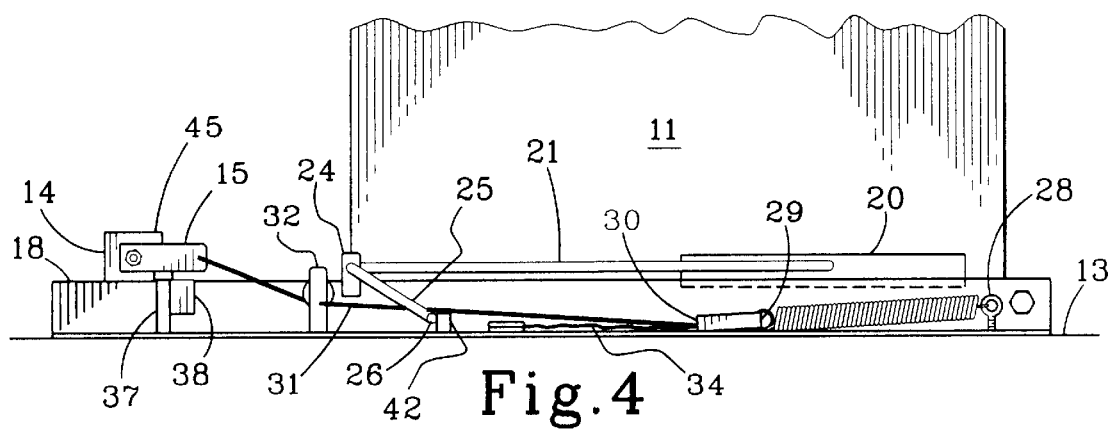
FIG. 4 is a side view of the embodiment of FIG. 3.
Figure 5:
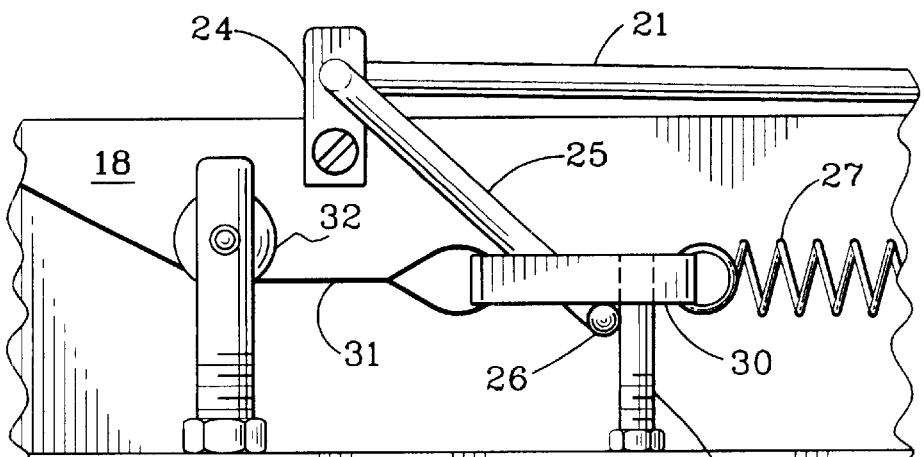
FIG. 5 is an enlarged fragmentary side view of the embodiment of FIG. 1.
Figure 6:
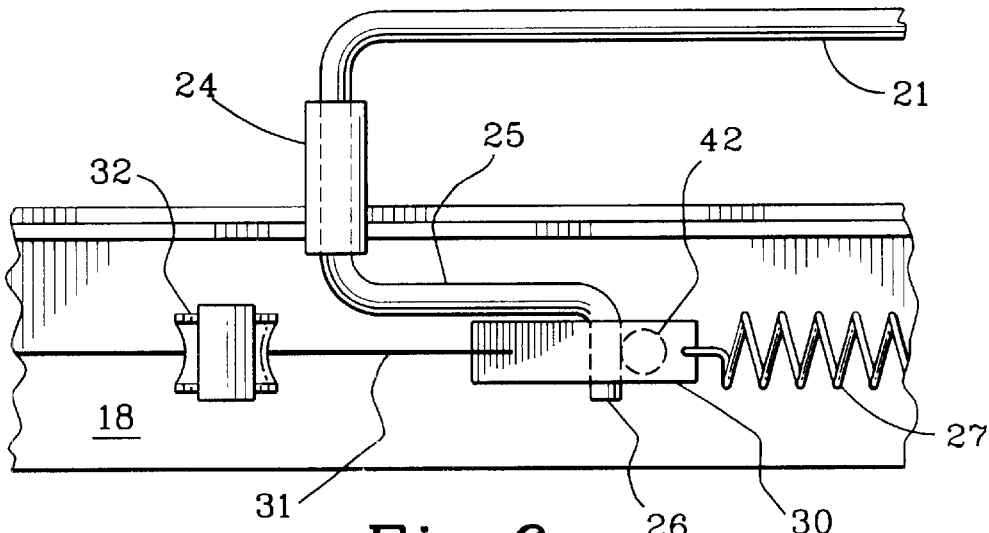
FIG. 6 is a top view of the embodiment of FIG. 5.
Figure 7:
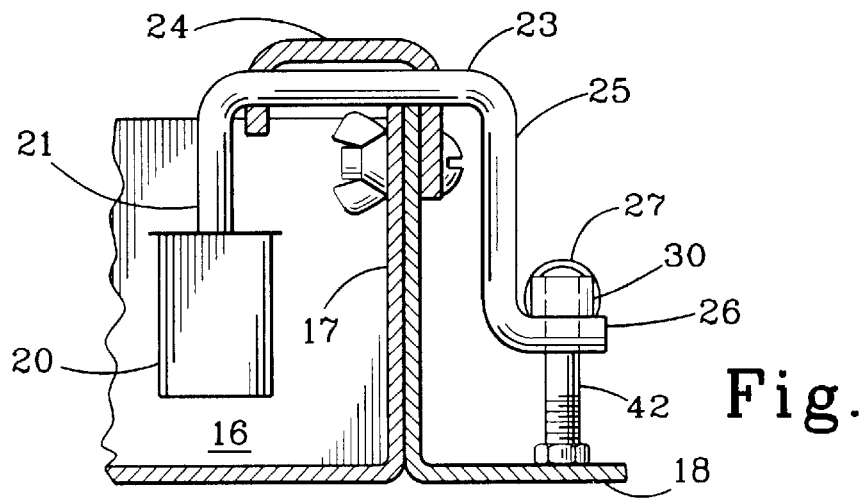
FIG. 7 is an enlarged sectional view taken in the direction of the arrows upon the line 7—7 of FIG. 1.

Referring now to FIGS. 1–7, an embodiment of the flood control apparatus 10 of the present invention is shown in association with a water heater 11.

Apparatus 10 is comprised of tray 16 having bottom panel 41 and upraised perimeter sidewall 17, said tray being configured to be positionable on the floor 13 beneath said water heater. An elongated rigid base strip, exemplified as angle bar 18 is attachable to said sidewall by way of clamping means or penetrating threaded fasteners 19.

Associated with angle bar 18 is float means 40 having a buoyant head 20 positioned within said tray. An elongated extension arm 21 extends from said head to a distal extremity 22. A transverse arm 23 extends orthogonally and horizontally from said distal extremity, and crosses over sidewall 17. Means for pivotally supporting transverse arm 23, in the form of bearing bracket 24, is attached to angle bar 18.

A downwardly directed arm 25 is emergent from said transverse arm, and terminates in trigger extremity 26. Said extension arm 21, transverse arm 23, and downwardly directed arm 25 may be derived from a single piece of metal rod stock by way of appropriate bending.

An elongated coil spring 27 having a normally contracted state extends between a first end 28 attached to angle bar 18 at a site adjacent buoyant head 20, and a second end 29 directed toward downwardly directed arm 25. Said second end is equipped with holding means in the form of block 30 having aperture 43 and configured to be releasibly interactive with trigger extremity 26 when said spring is forcibly stretched toward said trigger extremity as in the stand-by state of the apparatus. Said holding means may alternatively be in the form of a pulley wheel.

Engaging means in the form of post 42, upwardly directed from angle bar 18, interacts with block 30 by way of insertive penetration of aperture 43 in said block. Post 42 may be of threadably adjustable height.

A first tether 31, which is a compliant cord such as may be fabricated of nylon or polyester fiber, or metal wire, extends in engagement between the second end 29 of spring 27 and lever 15 pivotally associated with shut-off valve 14. Said valve has an upper extremity 45 adapted to connect with hose or pipe conduit means for delivering water to heater 11.

Guide means, which may be a pulley wheel 32, or stationary low friction eyelet, is secured to angle bar 18, and engages said first tether in a manner to cause said tether to have a sharply angled upward path 33 directed toward said lever in the stand-by state of the apparatus.

A second tether 34, which may be of cord, chain or equivalent construction, is attached to the second end 29 of spring 27 by way of block 30, and extends to a distal extremity having means in the form of ring 36 to facilitate manual gripping for exerting pulling force to extend said spring from its contracted to stretched state.

In the operation of the apparatus of the present invention, an accumulation of water in said tray from a leaking water heater causes buoyant head 20 to rise. Such action causes trigger extremity 26 to push block 30 upwardly off post 42, thereby releasing the stretched coil spring. The resultant retraction of the spring to its normally contracted state produces a pulling force upon first tether 31. The pulling force moves the lever downwardly to a position representing closure of shut-off valve 14.

In a preferred embodiment, a limiting post 37 of adjustable height is positioned on angle bar 18 for the purpose of limiting the downward movement of lever handle 15. A microswitch 38 may be positioned upon post 37. When contacted by said lever, thereby representing a shut-off condition, microswitch 38 causes an audio and/or visual alarm to be activated to alert the occupants of the building to the problem with the water heater.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus for automatedly shutting off a water supply to a leaking water heater, said apparatus comprising:

a) a water-collecting tray having a perimeter sidewall and adapted to be positioned beneath said water heater, b) an elongated rigid base strip attachable to said sidewall, c) a shut-off valve secured to said base strip and equipped with an operating lever, d) float means comprised of a buoyant head positioned within said tray, an elongated extension arm extending from said head to a distal extremity, a transverse arm extending orthogonally from said distal extremity and crossing over said sidewall, means for pivotally supporting said transverse arm, and a downwardly directed arm emergent from said transverse arm and terminating in a trigger extremity, e) an elongated coil spring having a normally contracted state and having a first end attached to said base strip at a site adjacent said buoyant head, and a second end directed toward said trigger extremity, f) holding means for securing the second end of said spring when said spring is forcefully stretched toward said trigger extremity, said holding means being interactive with said trigger extremity in a manner to release said spring when said buoyant head is elevated by virtue of flotation upon water collected in said tray, g) first tether means extending in engagement between the second end of said spring and the operating lever of said shut-off valve, h) guide means secured to said base strip for engaging said first tether in a manner causing said tether to have a sharply angled upward path directed toward said lever, and i) second tether means attached to the second end of said spring and extending to a distal end having means to facilitate manual gripping for exerting pulling force to extend said spring from its contracted to stretched state, whereby j) release of said stretched spring by said trigger extremity produces a pulling force upon said first tether means which moves said lever handle downwardly to a position representing closure of said shut-off valve.

2. The apparatus of claim 1 wherein said tray has a rectangular configuration.

3. The apparatus of claim 1 wherein said base strip is removably attached to said perimeter sidewall by way of penetrating threaded fasteners.

4. The apparatus of claim 1 wherein said base strip is an angle bar.

5. The apparatus of claim 4 wherein said means for pivotally supporting said transverse arm is a bearing bracket attached to said angle bar.

6. The apparatus of claim 1 wherein said extension arm, transverse arm and downwardly directed arm are portions of a single piece of metal rod stock shaped by an appropriate bending operation.

7. The apparatus of claim 1 wherein said holding means is a block having an aperture.

8. The apparatus of claim 1 wherein said trigger extremity is adapted to push said holding means upwardly.

9. The apparatus of claim 7 further including engaging means interactive with said block by way of insertive penetration of said aperture.

10. The apparatus of claim 9 wherein said engaging means is a post of threadably adjustable height upwardly directed from said base strip.

11. The apparatus of claim 1 further including adjustable limiting means for limiting the downward movement of said lever handle.

12. The apparatus of claim 11 further including a microswitch associated with said limiting means and adapted to produce an alarm which signals the presence of a leaking water heater.

* * * * *